US008763734B2

(12) United States Patent
Fetter et al.

(10) Patent No.: US 8,763,734 B2
(45) Date of Patent: Jul. 1, 2014

(54) DRIVE THROUGH AIR COMPRESSOR WITH CONE CLUTCH

(75) Inventors: Travis L. Fetter, Lexington, MO (US); Michael R. Jenkins, Kansas City, MO (US)

(73) Assignee: Haldex Brake Corporation, Kansas City, MO (US)

( * ) Notice: Subject to any disclaimer, the term of this patent is extended or adjusted under 35 U.S.C. 154(b) by 1922 days.

(21) Appl. No.: 11/697,092

(22) Filed: Apr. 5, 2007

(65) Prior Publication Data

US 2008/0245637 A1 Oct. 9, 2008

(51) Int. Cl.
F02B 63/00 (2006.01)

(52) U.S. Cl.
USPC ........................................ 180/53.1; 192/66.2

(58) Field of Classification Search
USPC ................. 417/223; 192/91 A, 66.2; 180/53.1
See application file for complete search history.

(56) References Cited

U.S. PATENT DOCUMENTS

| 4,129,404 | A |   | 12/1978 | Körner et al. |
|-----------|---|---|---------|---------------|
| 4,226,318 | A |   | 10/1980 | Morgan .......................... 192/85 |
| 4,561,827 | A |   | 12/1985 | Beaumont ...................... 417/223 |
| 4,632,639 | A |   | 12/1986 | Beaumont ...................... 417/223 |
| 4,648,805 | A |   | 3/1987  | Beaumont ...................... 417/223 |
| 4,805,706 | A |   | 2/1989  | Stone ............................... 173/93 |
| 4,880,407 | A |   | 11/1989 | Carton-Bacon ................. 464/43 |
| 4,915,598 | A |   | 4/1990  | Kubis |
| 5,497,742 | A | * | 3/1996  | Plantan ....................... 123/197.5 |
| 6,960,107 | B1|   | 11/2005 | Schaub et al. ................... 440/75 |
| 2004/0159524 | A1 | * | 8/2004 | Carpenter et al. ........... 192/91 A |
| 2005/0058551 | A1 |   | 3/2005 | Wakita et al. .................. 417/222 |

FOREIGN PATENT DOCUMENTS

| EP | 0 122 015     |   | 1/1989  |              |
|----|---------------|---|---------|--------------|
| GB | 2122268   A   | * | 1/1984  | ............. F04B 49/08 |
| GB | 2 136 510     |   | 9/1984  |              |
| GB | 2 162 254     |   | 1/1986  |              |
| GB | 2 162 255     |   | 1/1986  |              |
| GB | 2 176 255     |   | 12/1986 |              |
| JP | 57109353  U   |   | 7/1982  |              |
| JP | 60237179  A   |   | 11/1985 |              |
| JP | H02142321 U   |   | 12/1990 |              |
| JP | 2006275001 A  |   | 10/2006 |              |

OTHER PUBLICATIONS

European Search Report, EP08006878, Aug. 8, 2008, 2 Pages.

* cited by examiner

*Primary Examiner* — Katy M Ebner
(74) *Attorney, Agent, or Firm* — St. Onge Steward Johnston & Reens LLC

(57) ABSTRACT

A drive through crankshaft assembly which selectively provides rotational power to a vehicle accessory while continuously providing rotational power to a second vehicle accessory. Rotational power is selectively provided using a cone clutch assembly that is modular. The cone clutch assembly provides power to the first vehicle accessory when it is in an engaged state. The first vehicle accessory is turned off by putting the cone clutch assembly into a disengaged state using a clutch control system.

12 Claims, 3 Drawing Sheets

DRIVE THROUGH AIR COMPRESSOR WITH CONE CLUTCH

FIELD OF THE INVENTION

The present invention relates to a crankshaft assembly for selectively providing rotational power to at least one vehicle accessory while continuously supplying rotational power to at least one other vehicle accessory. In particular, this invention relates to a crankshaft assembly including a cone clutch device and a drive through air compressor.

BACKGROUND OF THE INVENTION

It is well-known in the art to utilize a clutch to selectively provide rotational power to a vehicle accessory such as an air compressor or other reciprocating device. U.S. Pat. Nos. 4,648,805, 4,632,639, and 4,561,827 to Beaumont each relate to an air compressor having a piston driven by a crankshaft. The crankshaft is supplied with rotational power by a multi-plate clutch when the clutch is engaged. The multiplate clutch has a driving portion and a driven portion. The driving portion of the clutch is provided with rotational power by a driveshaft. The piston of the air compressor is actuated by the crankshaft. The air compressor is de-activated by disengaging the clutch.

Devices such as and similar to that of the Beaumont design provide adequate means for selectively powering a single vehicle accessory. However, it was soon learned that the constant rotational power being supplied to the driving portion of the clutch by the driveshaft could be more efficiently allocated. In other words, the driving portion of the clutch and the driveshaft are continuously rotating whether the clutch is engaged or not. This rotational power goes to waste whenever the clutch is disengaged. One solution to this problem is that the continuous rotation could be used to power a vehicle accessory that did not require selective engagement like an air compressor. U.S. Pat. No. 5,497,742 to Plantan and U.K. Patent Application 2176255 of Christmas each disclose devices which utilize a clutch and a hollow crankshaft to drive a reciprocating device. The crankshaft is hollow so as to accommodate an extension of the driveshaft to drive a second device such as an alternator or a pump. The reciprocating device is powered whenever the clutch is engaged, but the second device is powered continuously. Both references disclose use of a multi-plate clutch.

The devices of the Plantan patent and the Christmas application suffer from significant disadvantages. First, their use of multi-plate clutches increases the complexity and cost of the system while decreasing the reliability, ease of installation, and ease of maintenance of the system. A further disadvantage of devices such as those disclosed by Plantan and Christmas is that disassembly of the device for maintenance or repair of the multi-plate clutch is burdensome and time-consuming due to the complexity in the way in which the clutch is mated to the vehicle accessory. This disadvantage exacerbates the problems relating to the complexity of the clutch itself. What is needed, therefore, is a device for powering vehicle accessories which addresses these shortcomings in the prior art.

The problems stemming from the multi-plate clutch design were addressed and reduced by the introduction of cone clutch systems. There are many examples of cone clutch systems in the mechanical arts. U.S. Pat. No. 4,226,318 to Morgan discloses a cone clutch that is hydraulically actuated and is representative of the general design of cone clutch systems. The cone clutch includes a female clutch member and a male clutch member. The female clutch member has a conically shaped annular inner surface. The male clutch member has a conically shaped annular outer shaped that is designed to mate with the female clutch member's inner surface. An input driveshaft, which is the source of rotational power in the system, is connected to the male clutch member. Depending on the intended application of the clutch system, the male clutch member can be urged into either engagement or disengagement with the female clutch member by, for example, coil springs. The female clutch member is attached to an output shaft or fabricated as a single, unitary piece with the shaft member. Thus, rotational power is provided by the input driveshaft which drives the male clutch member. When the male clutch member is engaged with the female clutch member, that is, when the annular, conical surfaces are in contact, rotational power is transmitted to the female clutch member and therefore also to the output shaft.

U.S. Patent Application Pub. 2004/0159524 of Carpenter et al. discloses a cone clutch for use with an air compressor. The Carpenter et al. system has a female cone member coupled to a crankshaft and a male cone member coupled to a driveshaft. The crankshaft drives an air compressor. The Carpenter et al. application discloses that a variety of accessories could be driven by the driveshaft simultaneously with the air compressor by mounting them on the input end of the driveshaft.

Other references disclose various applications of and improvements to cone clutch systems. U.S. Pat. No. 4,880,407 to Carton-Bacon discloses a cone clutch system which utilizes a layer of friction material between the conical surfaces of the clutch members. U.S. Pat. No. 4,805,706 to Stone discloses a rotary impact apparatus for use with an electric drill which utilizes a cone clutch. U.S. Pat. No. 6,960,107 to Schaub et al. discloses a marine transmission which uses a cone clutch to selectively transmit torque between a forward gear and a reverse gear. These and the above-mentioned documents are hereby incorporated by reference.

However, problems still remain in the art relating to the difficulty in attaching and integrating the clutch system to the vehicle accessories. As seen in the U.S. Pat. No. 4,648,805 Beaumont patent, attaching the multi-plate clutch assembly is a multi-step operation. First, a conical washer assembly and the clutch member are placed in the hollow clutch member. Then the clutch plates are introduced as well as an end member. The pre-load on the conical washer assembly is then set and the end member is secured by welding. This completed sub-assembly is placed in the clutch housing. The drive input shaft is then fed through the clutch plates with the splines to engage a bearing. Finally, a final bearing and an end cap are added to the assembly.

In the device disclosed by the Carpenter et al. application, access to the clutch for maintenance or repair purposes would also be difficult. If an accessory were to be driven by the driveshaft in addition to the air compressor on the input end of the driveshaft as disclosed, this would impede access to the clutch. In order to access the clutch the additional accessory would most likely be in the way or even be mounted on the clutch casing.

The Plantan patent and the Christmas application suffer from the additional disadvantage that their clutch components and first vehicle accessory components are intermingled. The driveshafts disclosed in each consist of a single piece which extends through the clutch and the crankshaft to the second device to be supplied with continuous power. Because of this design, repair and maintenance service to either the accessories or the clutch will disable the entire assembly.

The designs of the prior art cost valuable time whenever repair, maintenance, or replacement is needed. This is due not only of the increased complexity of the multi-plate clutch design, but also the lack of a simple interface between the clutch system and the vehicle accessory. What is needed, then, is a device for driving multiple vehicle accessories that is simple to assemble, maintain, repair, and install. In particular, a device is needed having the aforementioned characteristics as well as the capability to selectively power at least one vehicle accessory while simultaneously providing continuous power to at least one other vehicle accessory.

SUMMARY OF THE INVENTION

Therefore, it is an object of the present invention to provide a crankshaft assembly which selectively provides rotational power to a first vehicle accessory while continuously providing rotational power to a second vehicle accessory.

It is another object of the present invention to provide a crankshaft assembly that is simple and inexpensive to repair, install, and maintain.

It is yet another object of the present invention to provide a crankshaft assembly that has a simple means of coupling to one or more vehicle accessories.

It is still another object of the present invention to provide a crankshaft assembly that is simple and inexpensive to manufacture.

The above objects and others are accomplished by one embodiment of the present invention by provision of a drive through crankshaft assembly, which includes a hollow crankshaft, a driveshaft, a first vehicle accessory, a second vehicle accessory, a source of rotational power, and a cone clutch assembly. The hollow crankshaft has a cylindrical bore extending along its longitudinal axis. The driveshaft extends through the cylindrical bore of the crankshaft along the axis of the crankshaft. The first vehicle accessory is coupled to the crankshaft and the second vehicle accessory is coupled to the driveshaft. The source of rotational power is coupled to the driveshaft and provides the driveshaft with continuous rotational power. The cone clutch assembly will selectively transmit rotational power to the crankshaft from the driveshaft. The cone clutch assembly includes a male clutch member having an external cone-shaped friction surface and coupled to one of the crankshaft or the driveshaft and a female clutch member having an internal cone-shaped friction surface coupled to the other of the crankshaft or the driveshaft. Either the male clutch member or the female clutch member is movable relative to the other of the male clutch member or the female clutch member along the axis of the crankshaft and the driveshaft between an engaged position and a disengaged position. In the engaged position, the external cone-shaped friction surface and the internal cone-shaped friction surface are in contact with each other such that rotational power is transmitted from the driveshaft to the crankshaft. In the disengaged position the external cone-shaped friction surface and the internal cone-shaped friction surface are not in contact such that no rotational power is transmitted from the driveshaft to the crankshaft. The cone clutch assembly is provided as a modular unit attachable to one of the first vehicle accessory or the second vehicle accessory.

In some embodiments, the male clutch member is coupled to the one of the crankshaft or the driveshaft by involute splines. In some embodiments, the female clutch member is coupled to the one of the crankshaft or the driveshaft by involute splines. In some embodiments, the female clutch member and an output shaft are formed as a single piece and coupled to the other of the crankshaft or the driveshaft. In some embodiments, the driveshaft comprises as least two shaft members, one of which is disposed in and integral to the cone clutch assembly and which couples to the other shaft member which extends through the cylindrical bore of the crankshaft and is coupled to the second vehicle accessory.

In some embodiments, an o-ring-type sealing member is used between the cone clutch assembly and one of the first vehicle accessory or the second vehicle accessory. In some embodiments, the male clutch member and the female clutch member are urged into the engaged position by a spring force. In some embodiments, the spring force is provided by least one coil spring. In some embodiments, the male clutch member and the female clutch member may be moved relative to one another by a clutch control system. In some embodiments, the clutch control system moves the male clutch member or the female clutch member by hydraulic, pneumatic, mechanical, or electrical means.

In some embodiments, the first vehicle accessory is a reciprocating device and said crankshaft translates rotational power into reciprocal motion to power the first vehicle accessory. In some embodiments, an eccentric lobe formed on the crankshaft translates rotational power into reciprocal motion. In some embodiments, the first vehicle accessory comprises an air compressor. In some embodiments, the second vehicle accessory comprises an alternator or pump.

According to a second embodiment of the present invention, an assembly that selectively powers at least one vehicle accessory while continuously powering at least one other vehicle accessory is provided. The assembly includes at least one first vehicle accessory coupled to a crankshaft, at least one second vehicle accessory coupled to a driveshaft, a source of rotational power coupled to the driveshaft, and a cone clutch assembly. The crankshaft has a cylindrical bore such that the crankshaft is substantially hollow and the driveshaft extends through the cylindrical bore of the crankshaft. The cone clutch assembly includes a female clutch member coupled to the crankshaft and a male clutch member coupled to the driveshaft and moveable along the axis of the driveshaft. The female clutch member has an internal cone-shaped surface and the male clutch member has an external cone-shaped surface. The external cone-shaped surface makes substantially flush contact with the internal cone-shaped surface. The cone clutch assembly has an engaged state and a disengaged state. In the engaged state, the male clutch member is positioned relative to the female clutch member such that the external cone-shaped surface and the internal cone-shaped surface are in substantially flush contact to permit the transmission of rotational power from the male clutch member to the female clutch member. In the disengaged state, the male clutch member is positioned relative to the female clutch member such that the external cone-shaped surface and the internal cone-shaped surface are not in contact. Rotational power is selectively transmitted from the source to the at least one first vehicle accessory via the driveshaft, the cone clutch, and the crankshaft when the cone clutch assembly is in the engaged state. Rotational power is continuously transmitted from the source to the at least one second vehicle accessory via the driveshaft.

In some embodiments, the cone clutch assembly is provided as a modular unit for attachment to the at least one first or second vehicle accessory. In some embodiments, an o-ring type sealing member is used between the cone clutch assembly and the at least one first or second vehicle accessory to seal the connection thereof. In some embodiments, the driveshaft comprises as least two shaft members, one of which is disposed in and integral to the cone clutch assembly and which couples to the other shaft member which extends through said cylindrical bore of said crankshaft and is coupled to the second vehicle accessory.

In some embodiments, the female clutch member is coupled to the crankshaft by involute splines. In some embodiments, the male clutch member is coupled to the driveshaft by involute splines. In some embodiments, the female clutch member and an output shaft are formed as a single piece for coupling to the crankshaft. In some embodiments, the cone clutch assembly is urged into the engaged state by at least one coil spring exerting force on the male clutch member. In some embodiments, the male clutch member is moved by hydraulic, pneumatic, mechanical, or electrical means.

In some embodiments, the first vehicle accessory is a reciprocating device and said crankshaft translates rotational power into reciprocal motion to power the first vehicle accessory. In some embodiments, an eccentric lobe formed on the crankshaft translates rotational power into reciprocal motion. In some embodiments, the first vehicle accessory comprises an air compressor. In some embodiments, the second vehicle accessory comprises an alternator or pump.

According to a third embodiment of the present invention, an assembly that selectively provides rotational power to a first vehicle accessory while continuously providing rotational power to a second vehicle accessory is provided, which includes a hollow cylindrical crankshaft coupled to the first vehicle accessory, a cylindrical driveshaft coupled to the second vehicle accessory, a source of rotational power coupled to the driveshaft and providing continuous rotational power to the second vehicle accessory, and a cone clutch assembly connected to the first vehicle accessory. The driveshaft is disposed coaxially within the hollow crankshaft. The cone clutch assembly includes a male clutch member having a conical shape with an external conical surface. The male clutch member is coupled to the driveshaft by involute splines to permit movement of the male clutch member relative to the driveshaft along the axis of the driveshaft while prohibiting radial movement of the male clutch member relative to the driveshaft. The cone clutch assembly also includes a female clutch member having a conical cup shaped portion with an internal conical surface and an output shaft portion, wherein the conical cup shaped portion and the output shaft portion are formed as a single piece. The output shaft portion is coupled to the crankshaft by involute splines to prohibit movement of the female clutch member relative to the crankshaft. The cone clutch assembly has an engaged state in which the male clutch member is positioned along the axis of the driveshaft such that the external conical surface comes into substantially flush contact with the internal conical surface of the female clutch member so that rotational power is transmitted from the driveshaft and male clutch member to the female clutch member and crankshaft, thereby providing rotational power to the first vehicle accessory.

In some embodiments, the cone clutch assembly is provided as a modular unit. In some embodiments, the connection of the cone clutch assembly and the first vehicle accessory is sealed by an o-ring-type sealing member. In some embodiments, the driveshaft comprises as least two shaft members, one of which is disposed in and integral to the cone clutch assembly and which couples to the other shaft member which extends through the crankshaft and is coupled to the second vehicle accessory. In some embodiments, the cone clutch assembly is urged into the engaged stated by at least one coil spring exerting force on the male clutch member. In some embodiments, the male clutch member is moved by hydraulic, pneumatic, mechanical, or electrical means.

In some embodiments, the first vehicle accessory is a reciprocating device and the crankshaft translates rotational power into reciprocal motion to power the first vehicle accessory. In some embodiments, an eccentric lobe formed on the crankshaft translates rotational power into reciprocal motion. In some embodiments, the first vehicle accessory comprises an air compressor. In some embodiments, the second vehicle accessory comprises an alternator or pump.

According to yet another embodiment of the present invention a drive through crankshaft assembly is provided, which includes a reciprocating vehicle accessory, a hollow crankshaft coupled to the reciprocating vehicle accessory by an eccentric lobe formed on the crankshaft, a driveshaft disposed within the crankshaft and coupled to a second vehicle accessory, a source of rotational power, a cone clutch assembly mounted to the reciprocating vehicle accessory, and a clutch control system. The cone clutch assembly includes a female clutch member that is cone shaped such that it has an internal cone surface and coupled to said crankshaft by involute splines, a male clutch member that is cone shaped such that it has an external cone surface and is coupled to an shaft adapter by involute splines, wherein the male clutch member is movable in an axial direction along the shaft adapter and the shaft adapter is coupled to the driveshaft by involute splines and is coupled to the source. The cone clutch assembly has an engaged state such that the external cone surface is in substantially flush contact with the internal cone surface and rotational power is transmitted from the male clutch member to the female clutch member and a disengaged state such that the external cone surface is not in contact with the internal cone surface. The clutch control system moves the male clutch member. Rotational power is continuously transmitted from the source to the driveshaft adapter, the male clutch member, the driveshaft, and the second vehicle accessory. Rotational power is selectively transmitted from the source to the female clutch member, the crankshaft, and the reciprocating vehicle accessory through the driveshaft adapter and the male clutch member when the clutch is in an engaged state.

In some embodiments, the male clutch member is urged into contact with the female clutch member by a spring force. In some embodiments, the spring force is provided by at least one coil spring. In some embodiments, the cone clutch assembly is provided as a modular unit. In some embodiments, the connection between the cone clutch assembly and the first vehicle accessory is sealed by an o-ring-type sealing member. In some embodiments, the clutch control system is hydraulic, pneumatic, mechanical, or electrical.

Other objects and features of the present invention in addition to those mentioned above will be understood from the following detailed description and accompanying drawings.

DETAILED DESCRIPTION OF THE INVENTION

Figure 1:
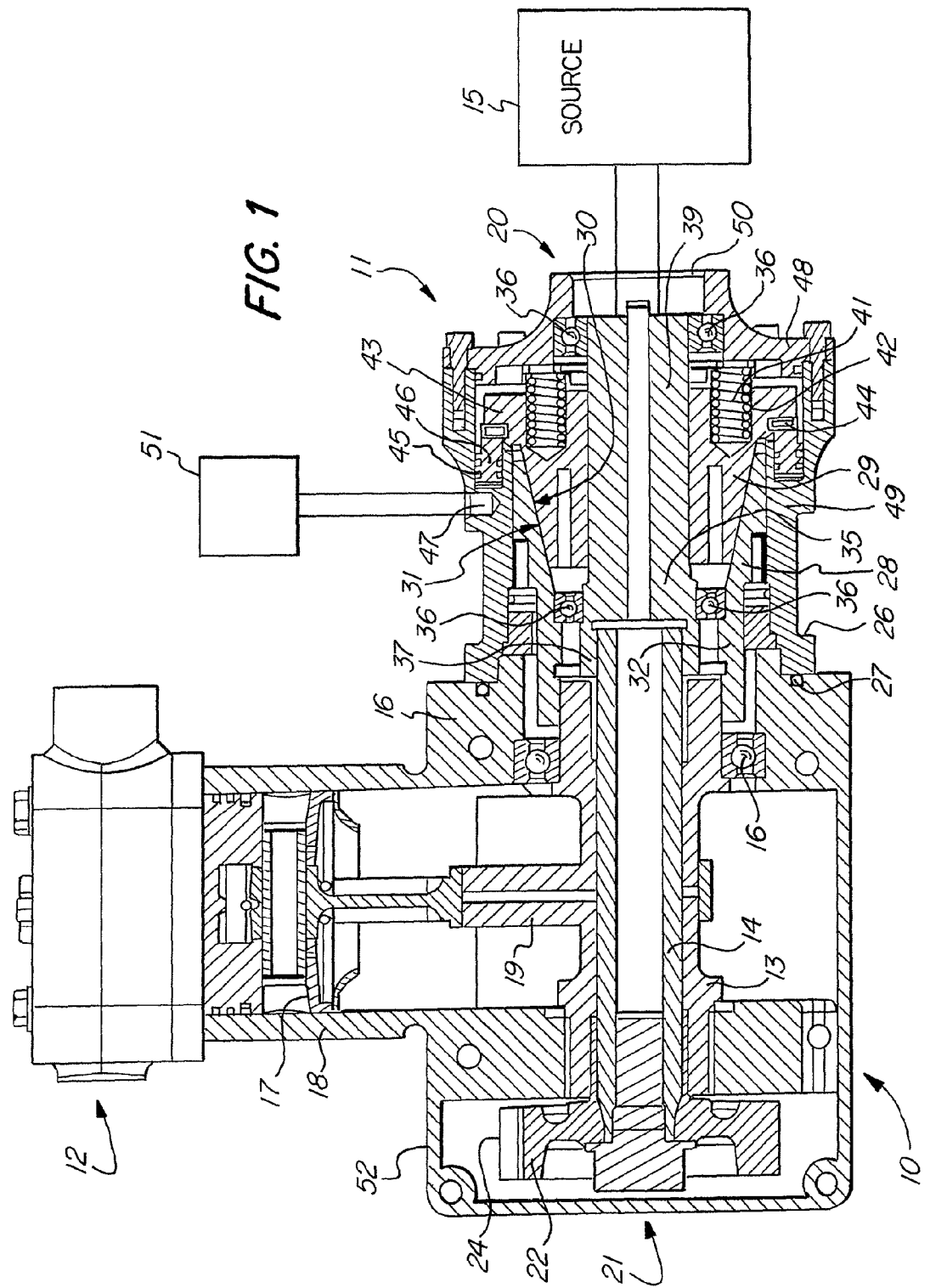
FIG. 1 is a longitudinal cross-section of an embodiment of the present invention.
Figure 2:
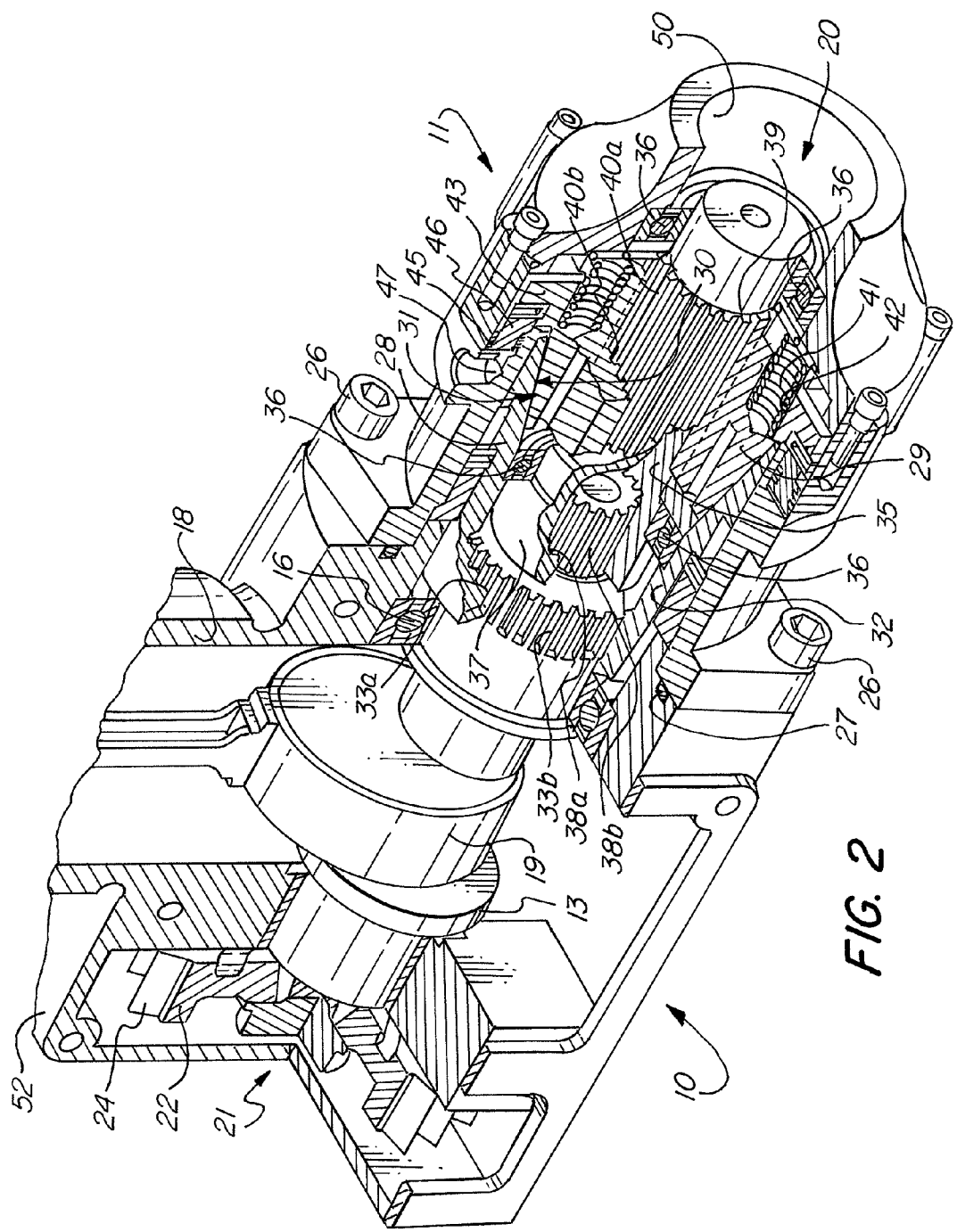
FIG. 2 is an isometric cross-section view of an embodiment of the present invention.

An embodiment of the present invention will now be described with reference to the attached FIGS. 1-3, wherein like numbers refer to like elements. FIG. 1 shows, in a longitudinal cross-section view, a crankshaft assembly 10 having a proximal side 20 and a distal side 21. FIG. 2 shows the crankshaft assembly 10 in an isometric cross-section view, which more clearly shows certain of the elements of the crankshaft assembly 10.

The crankshaft assembly 10 includes a first vehicle accessory, in this case an air compressor 12, a cone clutch 11, a crankshaft 13, a driveshaft 14, and a source of rotational power 15.

The crankshaft 13 has a cylindrical bore along its longitudinal axis such that it is substantially hollow. The driveshaft 14 is disposed within the cylindrical bore of the crankshaft 13 and protrudes from both the proximal end and the distal end of the crankshaft 13. The crankshaft 13 and the driveshaft 14 are designed so that each can rotate independently of one another with the application of a rotational force. Crankshaft 13 is rotatably supported by ball bearings 16. As shown best in FIG. 1, in the present embodiment the crankshaft 13 has a lobe 19 formed near the center of the longitudinal axis of the crankshaft 13. The lobe 19 is circular but is eccentrically located relative to the crankshaft 13, so that lobe 19 appears to move up and down as crankshaft 13 rotates. The lobe 19 is therefore an eccentric lobe.

In many embodiments of the present invention, the first vehicle accessory will be a reciprocating device such as an air compressor. The air compressor 12 shown in FIG. 1 has a piston 17 which reciprocates within compressor cylinder 18. The piston 17 is coupled to the lobe 19 so that when the crankshaft 13 is rotated, the lobe 19 moves up and down and drives the piston 17 up and down within cylinder 18. In this way, the air compressor generates compressed air. In many embodiments of the present invention, more than one vehicle accessory may be coupled to the crankshaft 13 and provided rotational power thereby. For example, the length of crankshaft 13 could be extended to accommodate additional lobes similar to lobe 19. This and similar modifications are readily ascertained by one skilled in the art.

On the distal end of the driveshaft 14 a drive wheel 22 is mounted. The drive wheel 22 is used to supply rotational power to a second vehicle accessory which is not shown in the drawings. The second vehicle accessory may be any vehicle accessory which utilizes rotational power. Examples of such vehicle accessories include alternators and pumps. The drive wheel 22 has gear teeth 24 formed on its external radial surface. The gear teeth 24 engage with gear teeth on an accessory drive wheel (also not shown in the drawings) of the second vehicle accessory so that rotational power is transmitted from the driveshaft 14 to the second vehicle accessory. In other embodiments, other means could be used to transmit rotational power to the second vehicle accessory, for example a belt-drive mechanism or splines formed on the drive wheels. In some embodiments, the second vehicle accessory could be a reciprocating device. In these embodiments, the drive wheel 22 could be a lobe similar to lobe 19. In many embodiments of the present invention, the driveshaft may transmit rotational power to more than one second vehicle accessory by various means. For example, the distal end of driveshaft 14 could be extended longitudinally to accommodate more than one drive wheel 22. Such a modification is readily ascertained by one of skill in the art.

The figures also show the cone clutch 11 mounted on the proximal side of the air compressor 12. The cone clutch 11 is bolted on to the air compressor 12 by attachment bolts 26. The connection between the cone clutch 11 and the air compressor 12 is sealed by an o-ring type seal 27. The o-ring seal 27 prevents the interior of the cone clutch 11 and the air compressor 12 from being in communication with the external environment.

The cone clutch 11 includes a female clutch member 28 and a male clutch member 29. Both clutch members 28 and 29 are generally annular and are coaxial with each other as well as the crankshaft 13 and driveshaft 14. Both clutch members 28 and 29 also have an annular cone-shaped surface. The female clutch member 28 has an internal cone-shaped surface 30 and the male clutch member 29 has an external cone-shaped surface 31. The cone-shaped surfaces of both clutch members are complimentary, i.e., they are designed such that substantially all of their respective surface areas will make substantially flush contact when the clutch members are brought to contact.

As shown in FIGS. 1 and 2, the female clutch member 28 includes an annular shaft portion 32 which functions as an output shaft. The female clutch member 28 is formed as a single piece, i.e., the portion having the internal cone-shaped surface 30 and the shaft portion 32 are a single piece. The shaft portion 32 has involute splines 33a on its internal diameter, which couple to involute splines 33b on the proximal end of crankshaft 13. The involute splines 33 prevent the female clutch member 28 from rotating relative to the crankshaft 13 and allow the transmission of rotational power from the female clutch member 28 to the crankshaft 13. The involute splines 33 are shown in FIG. 2. As used throughout the present disclosure, the term "involute splines" is given its custom and ordinary meaning in the art. "Involute splines" refers to splines which are not square, but which have an angled profile as shown in FIG. 2.

In the embodiment shown in the figures, the female clutch member 28 is not permitted to move along the axis of the driveshaft 14 and crankshaft 13, but is permitted to rotate about that axis. Bearings 36 rotatably support the female clutch member 28.

Cone clutch 11 includes a driveshaft adapter 35 which is coaxial with and couples to the driveshaft 14. The male clutch member 29 is mounted on the driveshaft adapter 35. The driveshaft adapter 35 has a coupling portion 37 for coupling to the driveshaft 14. The coupling portion 37 has involute splines 38a formed on its inner annular surface designed to mate with involute splines 38b formed on the proximal end of the driveshaft 14. Thus, the involute splines 38 prevent the driveshaft adapter 35 from rotating relative to the driveshaft 14 and permit rotational power to be transmitted between the two parts. Again, the involute splines 38 are shown in FIG. 2.

The present embodiment utilizes involute splines to couple the cone clutch 11 to the crankshaft 13 and driveshaft 14. Involute splines are the preferred coupling means, however other coupling means are possible. Involute spline systems are far simpler for installation purposes than other systems, such as a key system. In a key system, a single key element formed on one of the members to be coupled is disposed in a corresponding key seat on the other member to be coupled. In a key system, the components to be coupled must be arranged in a specific orientation so that the key element lines up with the key seat. The involute spline systems 38 and 33, however, may be coupled without regard to their orientation because the splines are uniformly distributed about the axis of the coupling members on the surfaces that will be brought into contact. Such a design makes installation of the cone clutch assembly 11 much easier.

The male clutch member 29 is mounted on a shaft portion 39 of driveshaft adapter 35. The shaft portion 39 has involute splines 40a formed on its external surface. Involute splines 40a extend along the length of the shaft portion 39 of driveshaft adapter 35. The male clutch member 29 has involute splines 40b formed on an internal annular surface that mate with involute splines 40a of the shaft portion 39. The shaft portion 39 is dimensioned so as to permit the male clutch member 29 to slide axially along the length of the shaft portion 39 to a selected degree. The involute splines 40, however, prohibit relative rotation between the male clutch member 29 and the shaft portion 39 and allow the transmission of rotational power between these two parts. The involute splines 40 are shown in FIG. 2. The proximal end of the driveshaft adapter 35 is coupled to the source of rotational power 15. The connection may be made by splines, gears, or belts depending on the particular embodiment. The source could be, for example, the motor of a motor vehicle. As discussed in more detail below, the source provides rotational power to the entire crankshaft assembly 10.

In the embodiment shown in the figures, the male clutch member 29 is acted upon by a spring force, urging it in a distal direction. The spring force is supplied by coil springs 41 which are disposed within cylindrical pockets 42 formed in the proximal side of male clutch member 29. The male clutch member 29 is therefore urged into contact with the female clutch member 28 through the spring force created by the coil springs 42 such that the cone clutch 11 is maintained in an engaged state. When the cone clutch 11 is in the engaged state, which is shown in FIGS. 1 and 2, the male clutch member 29 is positioned relative to the female clutch member 28 such that the internal cone-shaped surface 30 and the external cone-shaped surface 31 are in substantially flush contact. When there is substantially flush contact between these surfaces, rotational power is transmitted from the male clutch member 29 to the female clutch member 28.

The cone clutch 11 also includes a clutch control system 51 for disengaging the male clutch member 29 from the female clutch member 28. The male clutch member 29 has an annular lip 43 on its proximal end which has a distally-facing surface 44. The surface 44 is in contact with pistons 45 which are disposed within cylinders 46 and disposed at regular intervals around the diameter of the male clutch member 29. The pistons 45 are used to exert force on the male clutch member 29 sufficient to overcome the spring force of the coil springs 41 and move the male clutch member 29 away from the female clutch member 28. In the embodiment shown in the figures, the clutch control system 51 is pneumatic, and one inlet 47 is shown which allows for air pressure to push on the pistons 45. However, more than one inlet 47 may be present in the cone clutch 11. In other embodiments, a hydraulic, mechanical, or electrical clutch control system can be employed in a similar fashion. The operation of the clutch control system 51 may be governed by a vehicle system monitoring computer, the vehicle operator, or other means.

The cone clutch 11 has an end cap 48 on its proximal end to contain and hold its components within the case 49. The end cap 48 is bolted onto the case 49 and includes an opening 50 to accommodate the connection between the driveshaft adapter 35 and the source 15.

Figure 3:
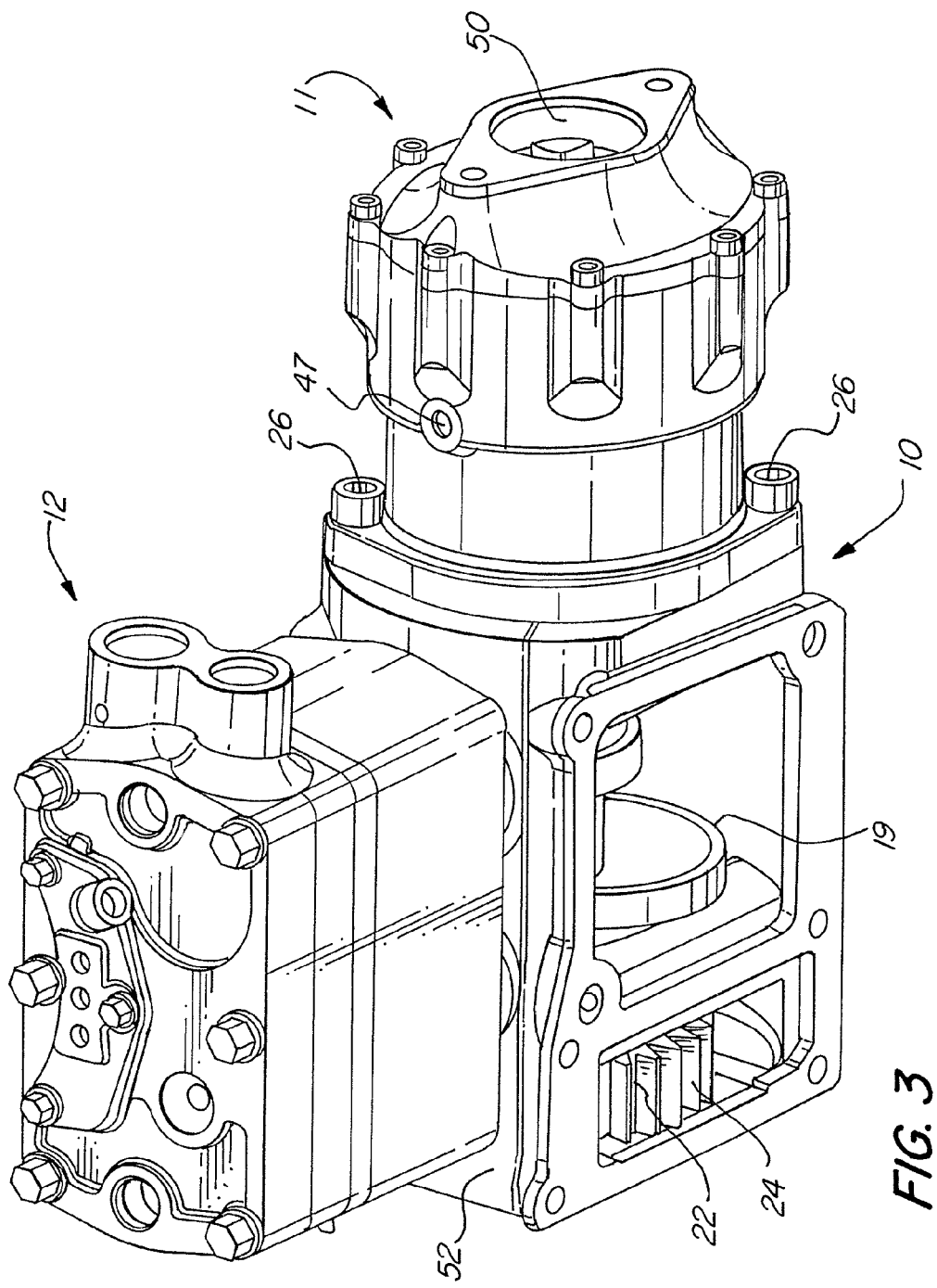
FIG. 3 is an isometric view of an embodiment of the present invention.

FIGS. 1, 2, and 3 show an important aspect of the cone clutch 11 of the present embodiment. The cone clutch 11 is designed to be a substantially self-contained modular unit to ease installation, repair, and maintenance of the clutch assembly. This is accomplished by designing the cone clutch 11 to have generic attachment means, such as the bolts used in the presently described embodiment. Further, the cone clutch 11 should have simple means for coupling its working components, i.e., the shaft portion 32 of the female clutch member 28 and the driveshaft adapter 35, to the working components of the vehicle accessory, such as the crankshaft 13 and the driveshaft 14. The embodiment shown in FIGS. 1, 2, and 3 accomplishes this by using involute splines which are relatively easy to couple. The cone clutch 11 is shown to be bolted to the air compressor 12, but may be attached to and used with various devices.

The modular aspect of the cone clutch 11 is further enhanced by the use of the driveshaft adapter 35 which divides the effective driveshaft into two components. By "effective driveshaft," it is meant the means for transmitting rotational power from the source 15 to the system. As discussed above, in many prior art devices the driveshaft is a single piece which extends through both the clutch assembly and the first vehicle accessory. In the embodiment shown in the figures, however, the effective driveshaft is made up of the driveshaft adapter 35 which is part of the cone clutch assembly 11 and the driveshaft 14 which is part of the air compressor 12. This improves the ease of removal of the clutch unit for work on either the clutch itself or the first vehicle accessory. The two-piece effective driveshaft in combination with the simple means of using involute splines to couple between the cone clutch 11 and the accessory make it easy to use the air compressor 12 with other clutch units or the cone clutch unit with other vehicle accessories. When it is desired to remove the cone clutch 11 it is simply unbolted and may be replaced with a similar unit.

FIG. 3 is an isometric view of the external surfaces of the crankshaft assembly 10 shown FIGS. 1 and 2. The cone clutch assembly 11 is shown bolted to the first vehicle accessory, air compressor 12, by bolts 26. Drive wheel 22 is visible through an opening in the case 52, as well as the gear teeth 24 which are formed thereon. The lobe 19 is also visible. FIG. 3 provides an alternative view of inlet 47, which is part of the clutch control system 51. Opening 50 is also shown in FIG. 3.

The typical means of operation of the embodiment shown in the figures will now be described. First, the functioning of the system will be described as it would be when the cone clutch 11 is in an engaged state. In the embodiment shown in the figures and described above, the engaged state is the default state due to the urging of the male clutch member 29 by the coil springs 41. In an engaged state, the clutch control system 51 provides insufficient force on the pistons 45 to overcome the spring force of coil springs 41, and therefore the male clutch member 29 is urged into substantially flush contact with the female clutch member 28. The source 15 provides continuous rotational power to the driveshaft adapter 35. Therefore, the male clutch member 29, the driveshaft 14, the drive wheel 22, and a second vehicle accessory receive continuous rotational power. So, when the male dutch member 29 comes into contact with the female clutch member 28, rotational power is transmitted to the female clutch member 28. The female clutch member 28 in turn transmits the rotational power to the crankshaft 13 which drives the air compressor 12. Therefore, the air compressor 12 can be selectively provided rotational power by engaging the cone clutch assembly 11, while the second vehicle accessory receives continuous rotational power.

The air compressor 12 can be turned off by ordering the cone clutch 11 into its disengaged state. Continuous rotational power is still provided to the drive wheel 22 and therefore a second vehicle accessory. The male clutch member 29 is forced to slide axially along the involute splines 40 of the driveshaft adapter 35 by the clutch control system 51, which utilizes inlets 47, pistons 45, and cylinders 46 to overcome the spring force created by the coil springs 41 by increasing the air pressure in the clutch control system 51. This brings the cone clutch 11 into a disengaged state, in which the male clutch member 29 is positioned such that its external cone-shaped surface 31 is not in contact with the internal cone-shaped surface 30 of the female clutch member 28. In the disengaged state, the female clutch member 28 receives no rotational power from the male clutch member 29, so the crankshaft 13 does not rotate and the air compressor 12 is not active. As stated above, the operation of the clutch control system 51 can be governed by a vehicle system monitoring computer or other means.

Thus, the embodiment of the present invention shown in FIGS. 1-3 provides an assembly for selectively powering at least one vehicle accessory while continuously powering at least one other vehicle accessory. The ease of repair, maintenance, and replacement of components of the assembly is also greatly improved by the modular design of the cone clutch assembly and the use of simple coupling means between components such as involute splines.

Although the invention has been described with reference to a particular arrangement of parts, features, and the like, these are not intended to exhaust all possible arrangements or features, and indeed many other modifications and variations will be ascertained by those skilled in the art.

What is claimed is:

1. An assembly that selectively powers at least one vehicle accessory while continuously powering at least one other vehicle accessory, comprising:
    a first vehicle accessory, coupled to a crankshaft having a cylindrical bore;
    a driveshaft extending through the cylindrical bore of the crankshaft for coupling to a second vehicle accessory; and
    a cone clutch assembly configured as a modular unit, comprising:
        a male clutch member having an external cone-shaped friction surface;
        a female clutch member having an internal cone-shaped friction surface;
        a case for holding the components of the cone clutch assembly and for attaching the cone clutch assembly to an accessory case of the first vehicle accessory; and
        a driveshaft adaptor which extends through the case and couples to the driveshaft and to a source of rotational power;
        wherein one of the male clutch member or the female clutch member is coupled to the crankshaft;
        wherein at least one of the male clutch member or the female clutch member is movable relative to the other of the male clutch member or the female clutch member along the axes of the crankshaft and the driveshaft between an engaged position in which the external cone-shaped friction surface and the internal cone-shaped friction surface are in contact with each other such that rotational power is transmitted between the male clutch member and the female clutch member and a disengaged position in which the external cone-shaped friction surface and the internal cone-shaped friction surface are not in contact such that no rotational power is transmitted between the male clutch member and the female clutch member;
        wherein the one of the male clutch member or the female clutch member that is not coupled to the crankshaft is coupled to the driveshaft adaptor.

2. The assembly of claim 1, wherein the male clutch member is coupled to one of said crankshaft or said driveshaft adaptor by involute splines.

3. The assembly of claim 1, wherein the female clutch member is coupled to one of said crankshaft or said driveshaft adaptor by involute splines.

4. The assembly of claim 1, wherein the male clutch member is coupled to said driveshaft adaptor and the female clutch member is coupled to said crankshaft.

5. The assembly of claim 4, wherein the cone clutch assembly further comprises an output shaft that is integral with the female clutch member and which couples to the crankshaft.

6. The assembly of claim 1, wherein the male clutch member or the female clutch member is urged into the engaged position by a spring force.

7. The assembly of claim 1, wherein the male clutch member and the female clutch member may be moved relative to one another by a clutch control system.

8. The assembly of claim 1, wherein an o-ring type sealing member is used between the case of the cone clutch assembly and the first vehicle accessory to seal the connection therebetween.

9. A cone clutch device configured as a modular unit for selectively providing rotational power to a first vehicle accessory while continuously providing rotational power to a second vehicle accessory, said device comprising:
    a male clutch member having an external cone-shaped friction surface;
    a female clutch member having an internal cone-shaped friction surface;
    an output shaft integral to the female clutch member for coupling to a crankshaft for powering the first vehicle accessory;
    a case for holding the components of the cone clutch device;
    a driveshaft adaptor which extends through the case for coupling to a driveshaft for powering the second vehicle accessory and for coupling to the male clutch member;
    wherein the male clutch member and the female clutch member are movable relative to one another between an engaged position and a disengaged position.

10. The device of claim 9, wherein the output shaft includes involute splines formed on an inner annular surface thereof for coupling with involute splines formed on an outer surface of the crankshaft.

11. The device of claim 9, wherein the driveshaft adaptor includes involute splines formed on an inner annular surface thereof for coupling with involute splines formed on an outer surface of the driveshaft.

12. The device of claim 11, wherein the driveshaft adaptor includes involute splines formed on a shaft portion for coupling with involute splines formed on an inner annular surface of the male clutch member.

\* \* \* \* \*